United States Patent [19]

Breneman

[11] Patent Number: 5,048,017
[45] Date of Patent: Sep. 10, 1991

[54] WATCHDOG TIMER

[76] Inventor: Brian H. Breneman, 150 W. Beaver St., Hellam, Pa. 17406

[21] Appl. No.: 291,500

[22] Filed: Dec. 29, 1988

[51] Int. Cl.⁵ .............................................. G06F 11/32
[52] U.S. Cl. ...................................... 371/16.3; 371/62
[58] Field of Search .............................. 371/16.3, 62; 364/200 MS File, 900 MS File

[56] References Cited

U.S. PATENT DOCUMENTS

| | | | |
|---|---|---|---|
| 4,137,565 | 1/1979 | Mager et al. | 364/200 |
| 4,209,828 | 6/1980 | Anderson et al. | 364/426 |
| 4,399,537 | 8/1983 | Jones | 371/62 |
| 4,405,982 | 9/1983 | Ruhnau et al. | 364/200 |
| 4,429,382 | 1/1984 | Greenstein et al. | 370/80 |
| 4,538,235 | 8/1985 | Henning | 364/569 |
| 4,570,217 | 2/1986 | Allen et al. | 364/188 |
| 4,586,179 | 4/1986 | Sirazi et al. | 371/16.3 |
| 4,586,180 | 4/1986 | Anders et al. | 371/16.3 |
| 4,600,987 | 7/1986 | Nambudiri | 371/16.3 |
| 4,625,309 | 11/1986 | Nitschke | 371/16.3 |
| 4,627,060 | 12/1986 | Huang et al. | 371/16.3 |
| 4,670,676 | 6/1987 | Nishitani | 371/62 |
| 4,685,124 | 8/1987 | Smitt et al. | 379/95 |
| 4,689,766 | 8/1987 | Kent | 364/900 |
| 4,710,928 | 12/1987 | Ueda | 371/62 |
| 4,751,630 | 6/1988 | Kelley, Jr. et al | 364/200 |

Primary Examiner—Charles E. Atkinson

[57] ABSTRACT

A watchdog device for monitoring control signals from a computer being used to control an operating system, is disclosed; said device having sufficiently low operating power requirements so that it is compatible with the power requirements of a series connecte LED indicator. The device is thereby capable of displaying a visual indication of its output status by activating an LED indicator which may be rack mounted or integrated into the device. In addition, the timer disclosed provides an adjustable timer interval which allows its adaptation to applications having widely differing time-out requirements. Depending on the requirements of the application, the adjustability is accomplished using a variable resistor, capacitor, or inductor for short timer intervals, or an oscillator driven frequency divider circuit for long timer intervals. Further, for steady state or non-periodic control signals, the device has no timing circuit, but provides an electromechanical relay to control the LED indicator and thereby provide a visual indication of control status.

7 Claims, 6 Drawing Sheets

WATCHDOG TIMER

BACKGROUND OF THE INVENTION

This invention relates to improvements in fault monitoring devices for computer controlled systems. More particularly, it relates to improvements in watchdog timers, or fault watch timers, which permit their use with a series connected light emitting diode, LED, indicator. The basic timing function is described in Disclosure Document No. 160368, filed Dec. 11, 1986, in the U.S. Patent and Trademark Office.

Computer control of processes is achieved by programming various output signals which are transmitted to the controlled device from the central processing unit, CPU. In most instances, these control signals toggle between on and off states or cause reversal of state in the controlled device. These state changes are periodic and can be monitored by a device such as a watchdog timer, or fault watch timer, which are currently commercially available and are commonly used in computer controlled operations.

The watchdog function is usually accomplished by an edge-triggered change-of-state detector which resets a timer having a predetermined time-out period So long as the programmed state changes continue, the timer is continually reset, and the watchdog timer output is inactive. However, if computer control is lost due to program error, brown-out, blackout, electromagnetic interference, radio frequency interference, or other cause, the expected change-of-state will not occur, and the watchdog timer will time-out and activate its output to alarm, reset, or shut down the system. All currently available watchdog timers function in essentially this same manner.

Typical prior art watchdog timer circuits are intended to obtain power from a direct power supply connection. Such circuits are not suitable for operation in an Input/Output mounting rack where all circuit power is by means of an LED in series with the power supply, because of excessive or insufficient current draw of these types of watchdog timers, in addition to their minimum voltage requirements.

BRIEF SUMMARY OF THE INVENTION

Accordingly, it is an object of this invention to provide a watchdog timer designed so that its current draw will be compatible with a series connected LED indicator.

It is a further object of this invention to provide a watchdog timer having an adjustable timing interval such that it may be specifically adjusted for each application and for each timing requirement.

A still further object of this invention is to provide a watchdog timer having an integrally mounted LED for use in I/O racks which do not have independently mounted LED indicators.

These objects are attained by the following methods:

Operation in series with an LED indicator is accomplished by incorporating a timer circuit which has a current draw which is less than one milliampere while the watchdog output is inactive. This is not sufficient to illuminate the LED. When the watchdog output is activated the current draw increases to approximately ten milliamperes, and the LED is illuminated. This gives the operator a positive indication of the watchdog output status.

Attainment of the adjustable timing interval is accomplished by either of two methods, depending on the design of the timing circuit. When the timing function is provided by an R-C or L-C circuit, the timing interval is adjusted by means of a variable resistor, capacitor, or inductor which changes the time response of the circuit. In cases where the timing function is provided by a crystal controlled oscillator, the timing interval is adjusted by digitally selecting the appropriate output division of the oscillator-driven frequency divider circuit. By either method, the timing interval of the timing circuit may be virtually tailored to the specific requirements of the control signals of the CPU.

Provision of the integrally mounted LED is accomplished by merely connecting the LED indicator in series with the power supply input to the watchdog timer module. Thus, for applications in which the I/O rack does not incorporate its own LED indicator. The watchdog timer would then incorporate the LED indicator. This situation would most often occur where the I/O rack is constructed for temporary test or experimental purposes. Incorporation of an integrally mounted LED indicator in the watchdog timer of such racks would avoid inconvenience and omission by inadvertence.

A better understanding of the invention may be had by reference to the Figures and the accompanying detailed description in which, FIG. 1 is a block diagram which shows the method of the underlying invention which permits use of the watchdog timer in series with an LED indicator in the I/O rack.

DETAILED DESCRIPTION OF THE INVENTION

Figure 1:
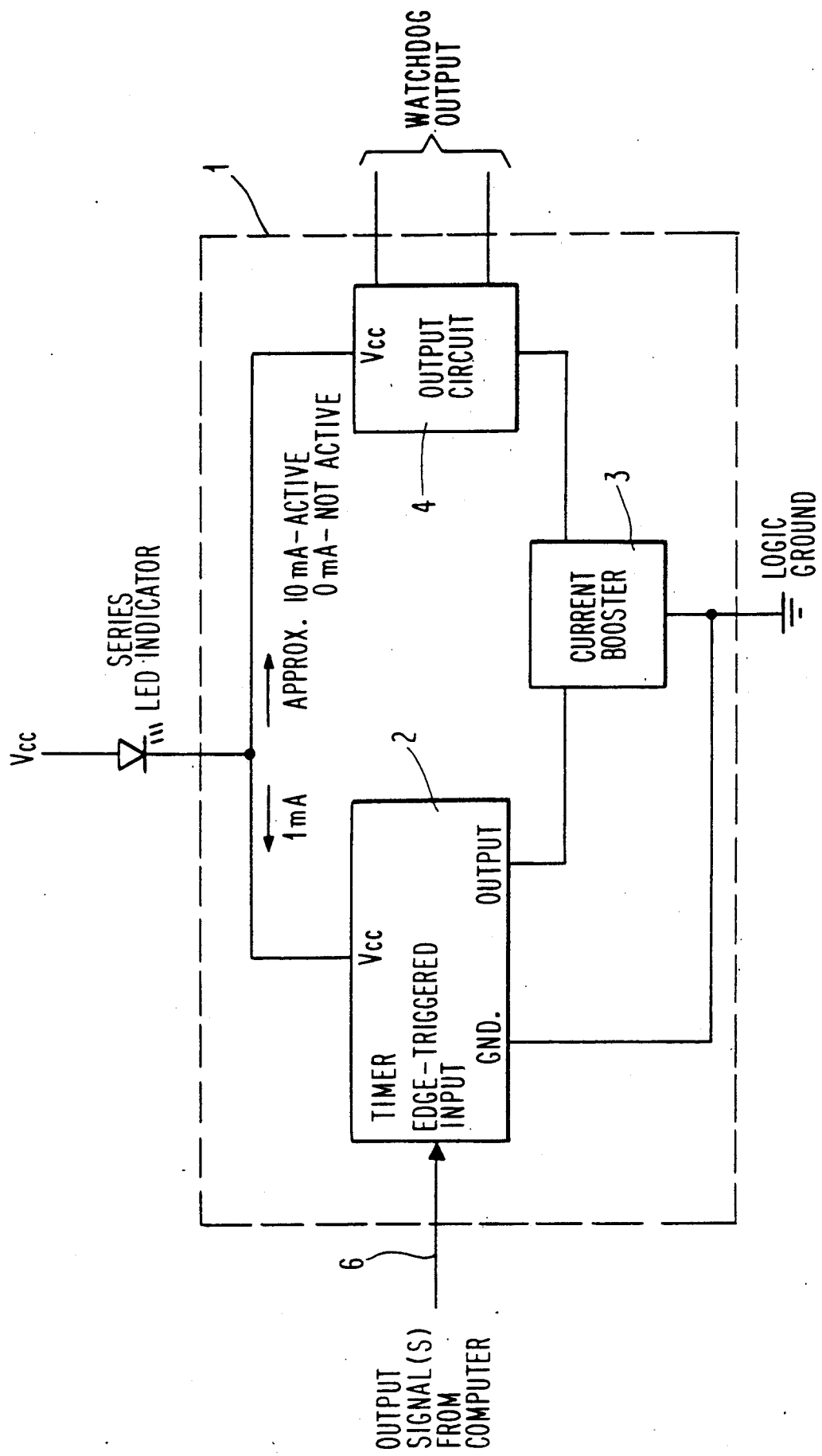

Referring to FIG. 1, the watchdog timer 1 is represented by the broken line encompassing the timer 2, the current booster 3, and the output circuit 4. The series connected LED indicator 5 is connected with the I/O rack power supply Vcc. Output signal(s) 6 are fed to the timer 2 which normally operates on a current of less than one milliampere, ma, when the timer circuit output is active. This is insufficient current to illuminate the LED indicator 5; however, by design, while the system is operating normally, the watchdog output circuit 4 is active. This causes a current draw of approximately ten ma which sustains the normally-on state of the LED indicator. If the output signals 6 from the CPU do not toggle, or alternate, within the preset timing interval of the timer 2, the timer output is inactivated. This deactivates the watchdog output which ceases the current draw through the output circuit 4 and turns-off the series connected LED indicator 5.

Figure 2:
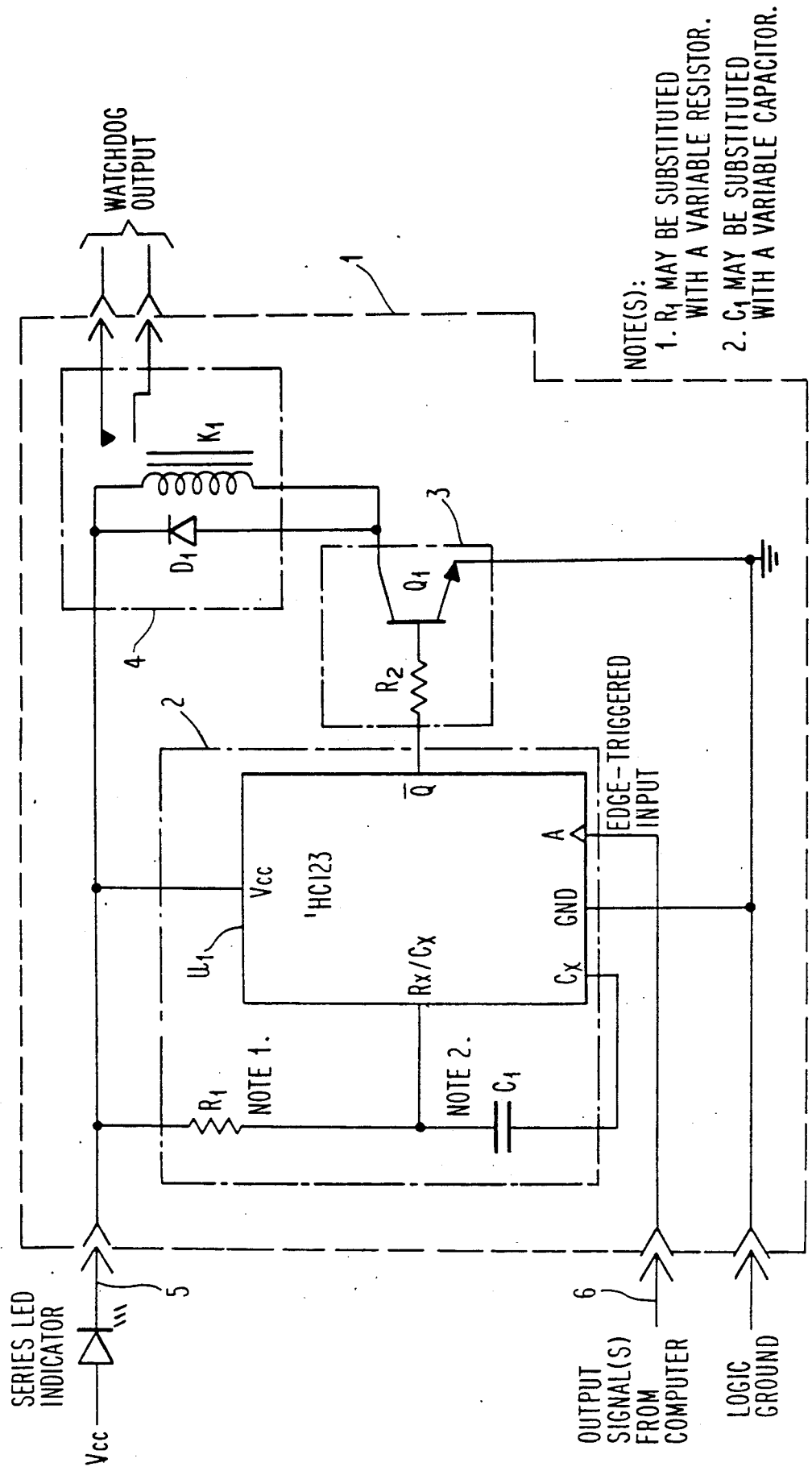
FIG. 2 is an exemplary circuit of FIG. 1 of the invention, in its simplest representation, showing the circuit elements needed for its basic operation.

FIG. 2 shows the invention in greater detail. The LED indicator 5 is illuminated when the output signals 6 from the computer are toggling normally and dark when the computer control fails and toggling does not occur within the prescribed time-out period. In this configuration, the timing circuit 2 is shown to consist of R1, C1, and U1. U1 is a retriggerable multivibrator integrated circuit having its own timing capability. The input A of U1 is edge-triggered which maintains the output $\overline{Q}$ active so long as the input changes more than twice during the time-out period determined by R1 and C1. While $\overline{Q}$ is active, Q1 is driven into saturation through R2 which limits the base current to Q1. This maintains the output circuit 4 active while $\overline{Q}$ is active. The current through K1, when active, is approximately ten ma, sufficient to illuminate the LED indicator 5. Diode D1 serves as a clamp to the back EMF of the K1 relay inductance.

If the output signal 6 from the computer does not change state within the prescribed time-out period, $\overline{Q}$ will deactivate turning off Q1 and deactivating K1. This turns off the LED indicator 5.

Figure 3:
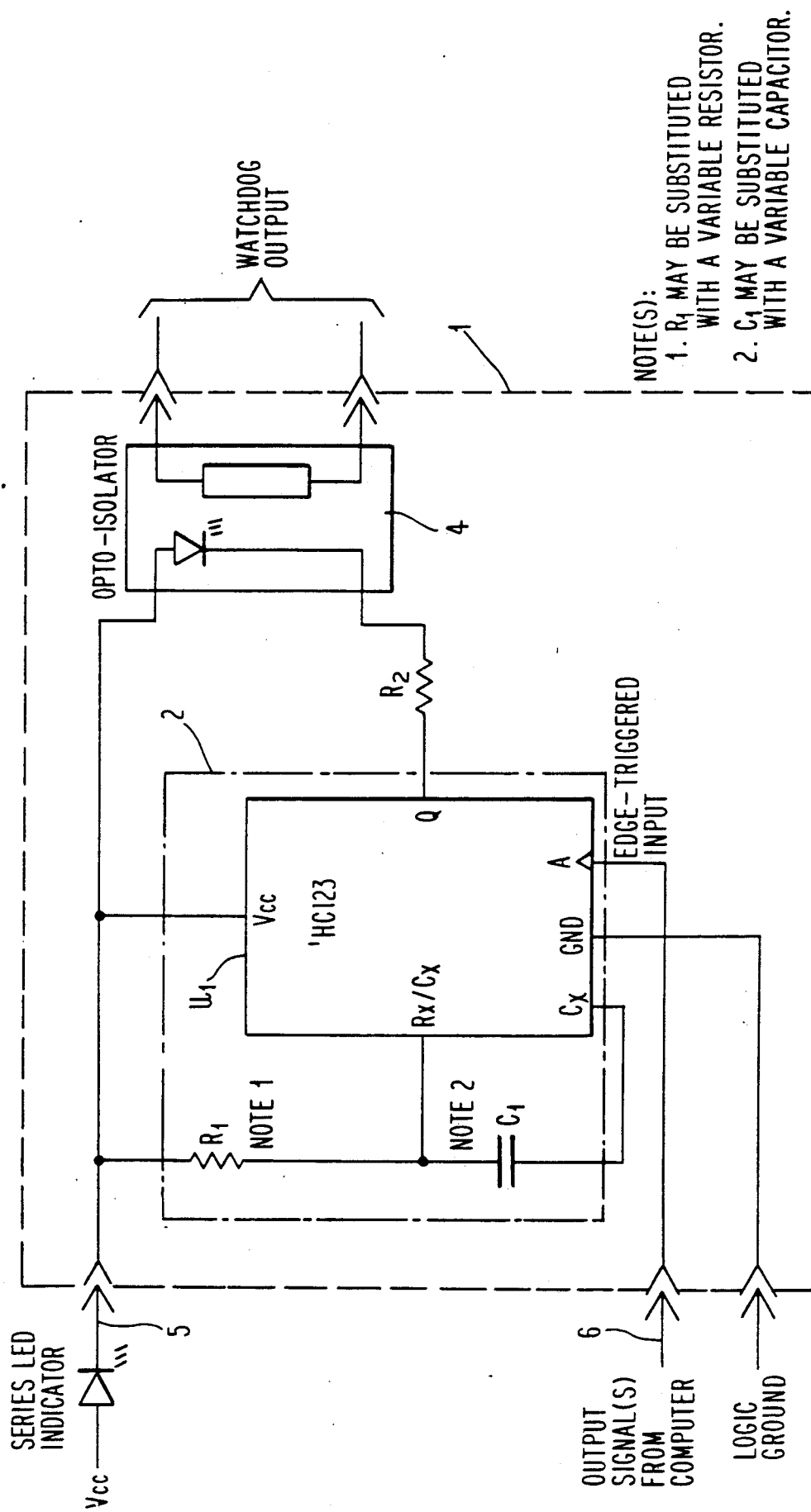
FIG. 3 is a representation of the circuit of FIG. 2 showing an alternative output circuit.

FIG. 3 shows an example of the invention which functions identically to the circuit of FIG. 2. In this case, however, the output circuit 4 consists of an optoisolator. When the output Q of the integrated circuit U1 is inactive during normal control operation it creates a current draw through the current limiting resistor R2 and the optoisolator. This activates the output circuit 4 and draws sufficient current, approximately 10 ma, to illuminate the LED indicator 5. The circuit of FIG. 3, thus, turns-off the LED 5 whenever the output signal 6 from the computer fails to change its state within the prescribed time period.

Figure 4:
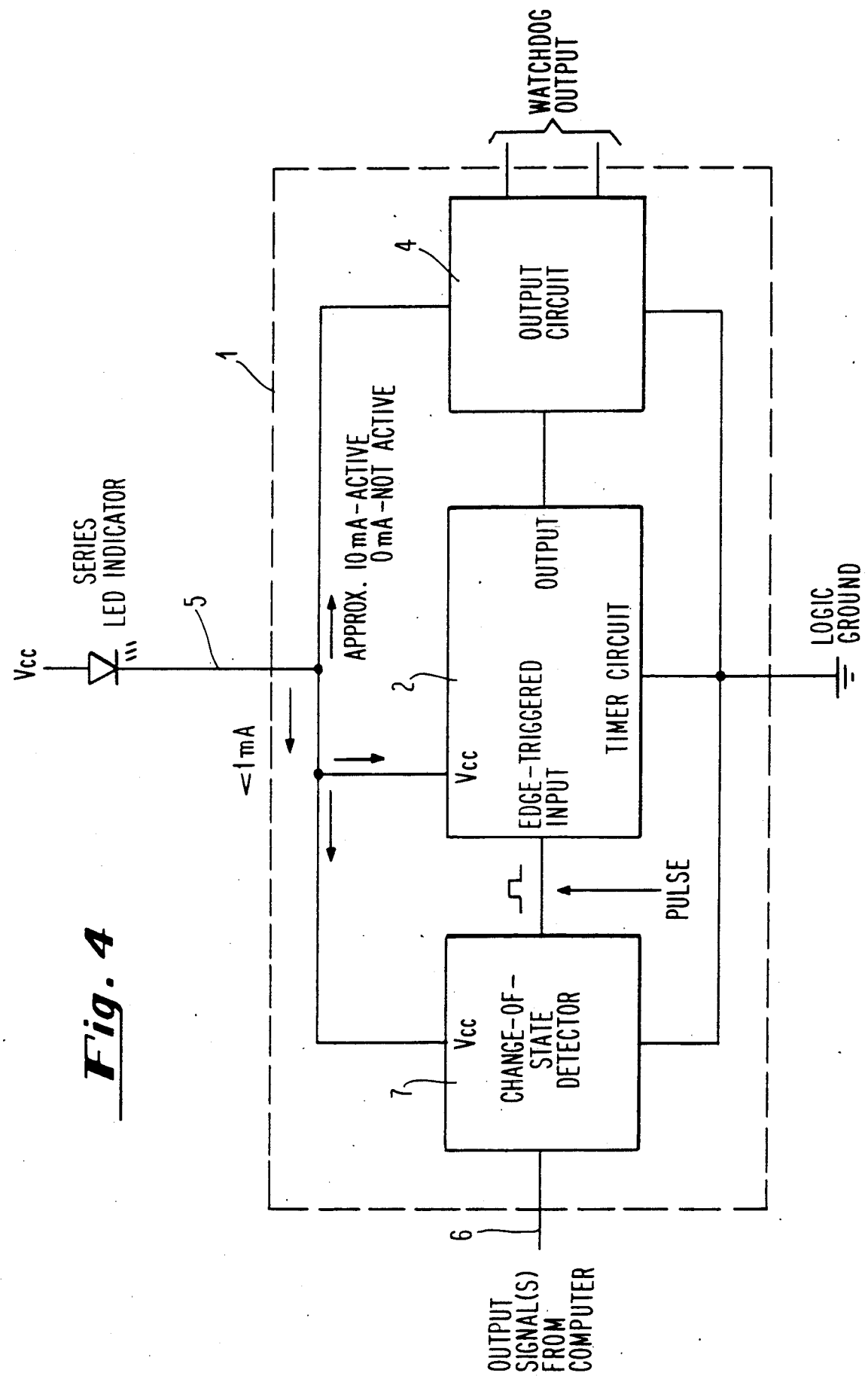
FIG. 4 is a block diagram showing another method of the invention using a change-of-state detector to generate a trigger pulse in response to positively changing or negatively changing input signals.

FIG. 4 shows a block diagram of the invention using a general change-of-state detector 7 to receive the output signals 6 of the CPU. This detects positive or negative changes in the CPU output (watchdog input) signals 6. The change of state detector 7 generates a square wave pulse upon receiving a positive or negative change in the output signal 6. This square wave pulse is received by the timer circuit 2 which responds to the input pulse and either resets or times-out. Time-out deactivates the output circuit 4 and turns off the LED indicator 1.

Figure 5:
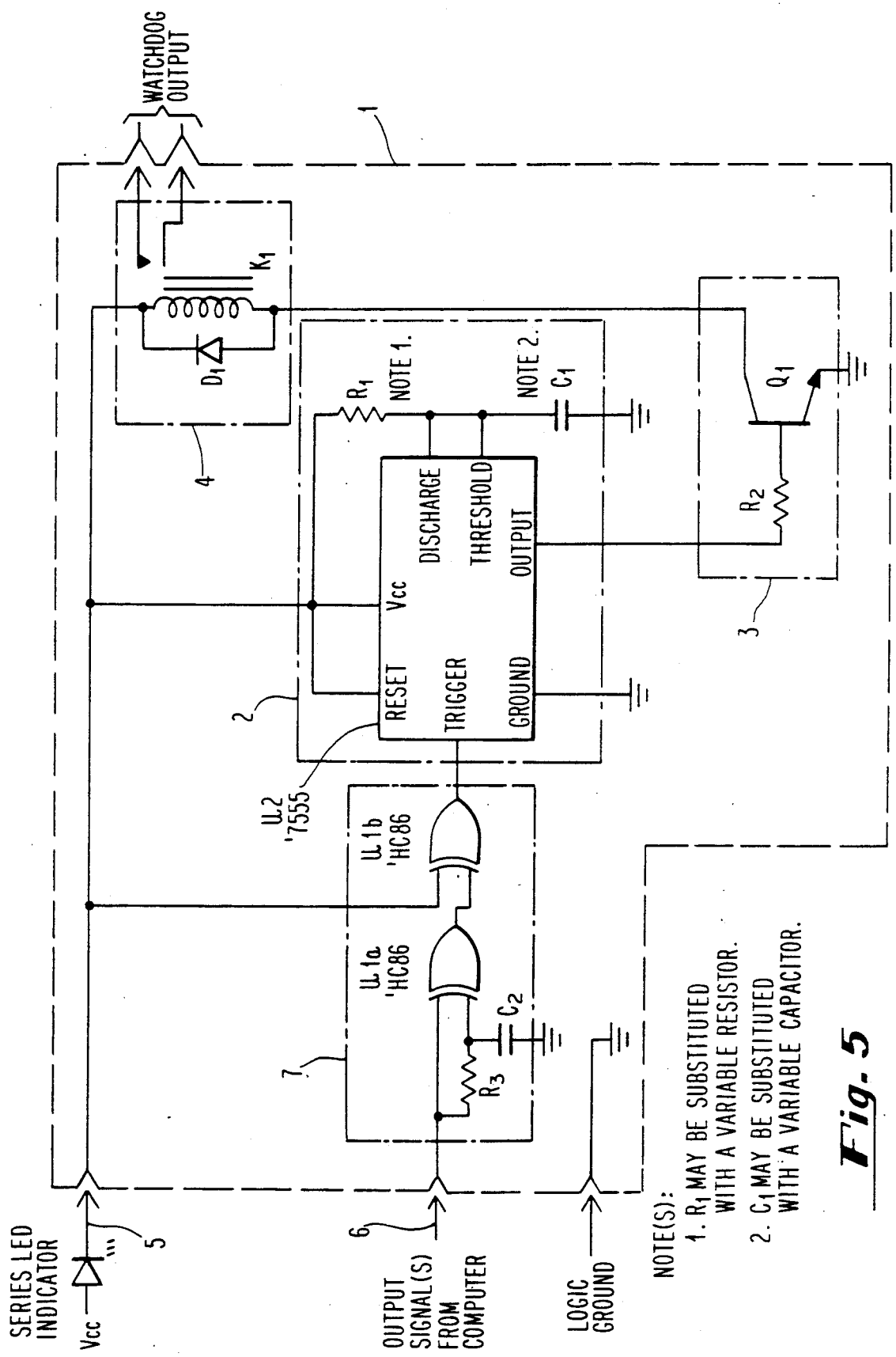
FIG. 5 is an exemplary circuit of FIG. 4 of the invention, showing the circuit elements needed for operation.

FIG. 5 is a more detailed representation of the circuit of FIG. 4. In this case, a positively or negatively changing output signal 6 from the computer will generate a square wave pulse at the output of U1a. The pulse width is determined by the values selected for R3 and C2. U1b inverts the pulse to trigger the monostable timer U2. If the period between changes of state exceeds the time-out period determined by R1 and C1, the output of U2 becomes inactive and turns off Q1. This deactivates the output circuit 4 and turns off the LED indicator 5. In this configuration, as in that shown in FIG. 2 the illuminated LED indicator 5 signifies that the output signal 6 from the computer is properly changing. U1a and U1b are identical integrated circuits designated as 'HC86, while U2 is an integrated circuit designated as '7555 in standard terminology.

Figure 6:
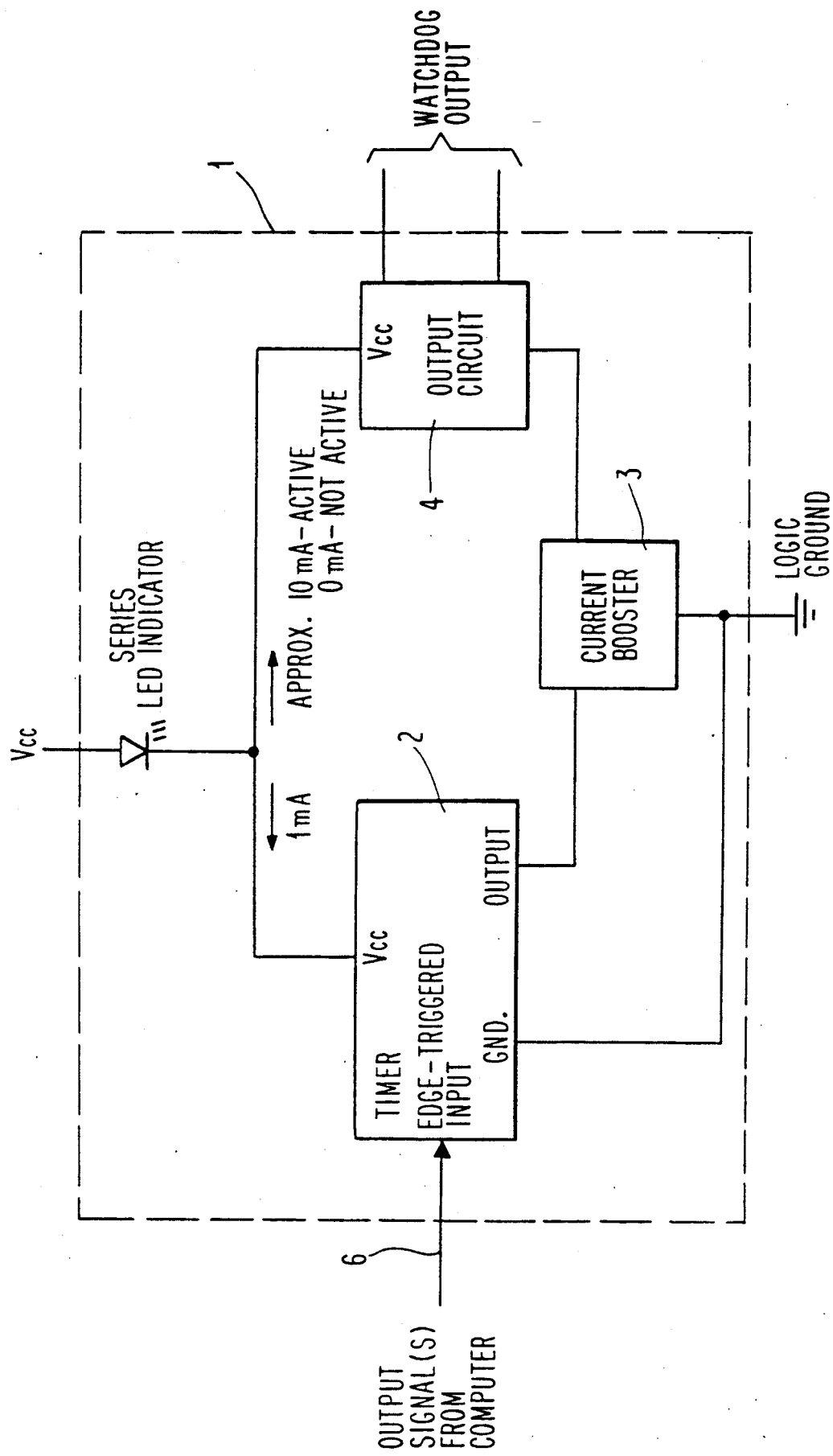
FIG. 6 is a block diagram as in FIG. 1 which shows incorporation of the LED indicator within the body of the watchdog timer of the invention.

FIG. 6 is a block diagram which illustrates the series LED indicator 5 incorporated within the body of the watchdog timer 1. This same incorporation of the LED indicator 5 may be attributed to any of the circuits illustrated in the drawing figures disclosed.

In operation, the watchdog timer in any of the configurations described, expects to receive toggling or changing output signals 6 from the computer. Depending on the mode of operation selected, the series connected LED indicator 5 may be illuminated to indicate proper operation of the control function, or it may be turned off during proper operation of the control function. In the normally illuminated configuration, the LED indicator 5 also serves to indicate power failures.

All configurations of the watchdog timer of the invention permit the incorporation of a variable timer circuit by providing a variable resistor, capacitor, or inductor. This provides an adjustable timing circuit 2 the period of which can be changed to suit timing requirements that may change from time to time. In laboratory applications where I/O racks are assembled for experimental or developmental purposes, this adjustability can provide a significant advantage over fixed interval timers by reducing the number of different timers required to be kept in laboratory stock and by providing improved convenience in responding to changing control requirements.

Another method of providing adjustability is by using a digitally varied crystal controlled oscillator to provide the timing function. To adjust the timing interval, it is necessary to digitally select the required output division of the oscillator-driven frequency divider circuit. Either method of providing adjustability may be used with equal effect.

The integrally mounted LED indicator 5 is connected in series with the power supply, Vcc, input pin of the watchdog timer 1. The convenience and time saving advantages of the integral LED would be appreciated by anyone assembling I/O racks.

For steady state or non-periodic control signals, where a watchdog timer may not be appropriate, control function monitoring is provided by an electromechanical relay which is series connected with an LED indicator and has no timing capability.

While the preferred embodiment of the invention has been described and illustrated above, it is clear that various modifications may be made within the scope and spirit of the invention. For instance different integrated circuits can be selected which, when properly accessorized within the watchdog timer, can provide the same timing function. Variations may also be provided in the timing circuit design to permit variable timing intervals. For example, in addition to the methods of variability heretofore described, the variable time interval may be provided by any oscillator or vibrator incorporated in a phase-lock loop, PLL. These and other embodiments will be apparent to those skilled in the art.

What is claimed is:

1. A watchdog timer for monitoring computer controlled systems, whereby the said watchdog timer requires a supply current less than that required to light an LED when the output is in an inactive state and requires a supply current equal to that required to light an LED when the output is in an active state, the improvement wherein all said supply current flows through a series connected LED and comprising:
    (a) an edge-triggered input for detecting state changing signals from a computer control system, and;
    (b) a timer which is reset by said detected state changes and further providing an output which indicates when said timer has timed out.

2. A watchdog timer according to claim 1 in which said series connected LED is an integral element of the watchdog timer.

3. A watchdog timer according to claim 1 in which the time-out period of the said timer is adjustable.

4. A watchdog timer according to claim 1 in which the time-out period of the said timer is determined by selecting divisions of an oscillator output.

5. A watchdog timer according to claim 1 in which the time-out period is adjustable by means of a variable resistor.

6. A watchdog timer according to claim 1 in which the time-out period is adjustable by means of a variable capacitor.

7. A watchdog timer according to claim 1 in which the time-out period is adjustable by means of a variable inductor.

* * * * *